(12) United States Patent
Van Zanten et al.

(10) Patent No.: US 7,050,116 B2
(45) Date of Patent: May 23, 2006

(54) CALIBRATION DEVICE FOR A VIDEO INPUT STAGE

(75) Inventors: Francois Van Zanten, Meylan (FR); Marc Sabut, Eybens (FR); Raymond Ribas, Saint Martin de la Cluze (FR)

(73) Assignee: STMicroelectronics, S.A., Montrouge (FR)

( * ) Notice: Subject to any disclaimer, the term of this patent is extended or adjusted under 35 U.S.C. 154(b) by 454 days.

(21) Appl. No.: 10/299,160

(22) Filed: Nov. 18, 2002

(65) Prior Publication Data

US 2003/0095209 A1 May 22, 2003

(30) Foreign Application Priority Data

Nov. 19, 2001 (FR) .................................. 01 14921

(51) Int. Cl.
*H04N 5/14* (2006.01)
*H04N 5/18* (2006.01)
*H04N 5/52* (2006.01)

(52) U.S. Cl. ...................... 348/707; 348/689; 348/572; 348/678

(58) Field of Classification Search ................ 348/678, 348/731, 689, 707, 725, 572; 330/7, 252, 330/254, 255, 257, 262, 278, 85; 341/118, 341/120, 126, 155; H04N 5/52, 5/18, 5/44, H04N 5/14
See application file for complete search history.

(56) References Cited

U.S. PATENT DOCUMENTS

| 4,831,378 | A | * | 5/1989 | Baars et al. ................. 341/139 |
| 5,371,552 | A | | 12/1994 | Brummette et al. |
| 5,982,311 | A | * | 11/1999 | Belin .......................... 341/118 |
| 6,219,107 | B1 | * | 4/2001 | Renner et al. ............... 348/678 |

FOREIGN PATENT DOCUMENTS

| DE | 38 17 421 A1 | 2/1990 |
| EP | 0 280 123 A1 | 8/1988 |
| EP | 0 462 804 A2 | 12/1991 |
| EP | 0 714 169 A1 | 5/1996 |

(Continued)

OTHER PUBLICATIONS

Redman-White et al. "A Robust Analog Interface System for Submicron CMOS Video DSP", IEEE Journal of Solid-State Circuits, vol. 33, No. 7, Jul. 30, 1998, pp. 1076-1081, XP000849165.

(Continued)

*Primary Examiner*—Sherrie Hsia
(74) *Attorney, Agent, or Firm*—Kisa K. Jorgenson; Jon A. Gibbons; Fleit, Kain, Gibbons, Gutman, Bongini & Bianco P.L.

(57) ABSTRACT

An input stage for a video receiver includes a variable gain amplifier, an analog-to-digital converter for sampling a video signal and a digital processing unit for processing digital samples of the video signal. An analog regulating circuit sets an input potential at an input of the variable gain amplifier. A differential architecture is used for the variable gain amplifier and the digital analog converter. A conversion circuit between an input coupling capacitor and the variable gain amplifier allows generating the video signal on two channels in antiphase, which are centered on the common mode voltage. Such differential architecture allows reducing the amplitude of analog signals, which is particularly advantageous in the case of a low voltage supply delivering a few volts. In addition, linearity of the video signal processing is enhanced.

12 Claims, 5 Drawing Sheets

FOREIGN PATENT DOCUMENTS

| | | |
|---|---|---|
| EP | 0 788 276 A2 | 8/1997 |
| EP | 0 872 960 A1 | 10/1998 |
| EP | 0 926 887 A2 | 6/1999 |
| WO | WO 00/14883 | 3/2000 |

OTHER PUBLICATIONS

French Preliminary Search Report dated Aug. 20, 2002 for French Application No. 01 14921.

* cited by examiner

CALIBRATION DEVICE FOR A VIDEO INPUT STAGE

CROSS-REFERENCE TO RELATED APPLICATION

This application is based upon and claims priority from prior French Patent Application No. 01 14921, filed on Nov. 19, 2001, the entire disclosure of which is herein incorporated by reference.

BACKGROUND OF THE INVENTION

1. Field of the Invention

The present invention relates to input stages for video processing, and more particularly to a calibration device for an input stage for processing a video signal.

2. Description of the Related Art

Input stages for processing video signals typically comprise a calibration circuit for calibrating downstream-located circuits in the receiver and for avoiding any saturation of these circuits.

A reference signal—corresponding to the coding of blacks—is used right after the line synchronization signal of the video signal, and the receiving circuit uses this reference to calibrate its internal circuits in order to avoid any saturation.

The performances required by video signal input circuits, together with the miniaturization of the latter and the reducing of supply voltage, enhance the weaknesses of known input stages.

Figure 1:
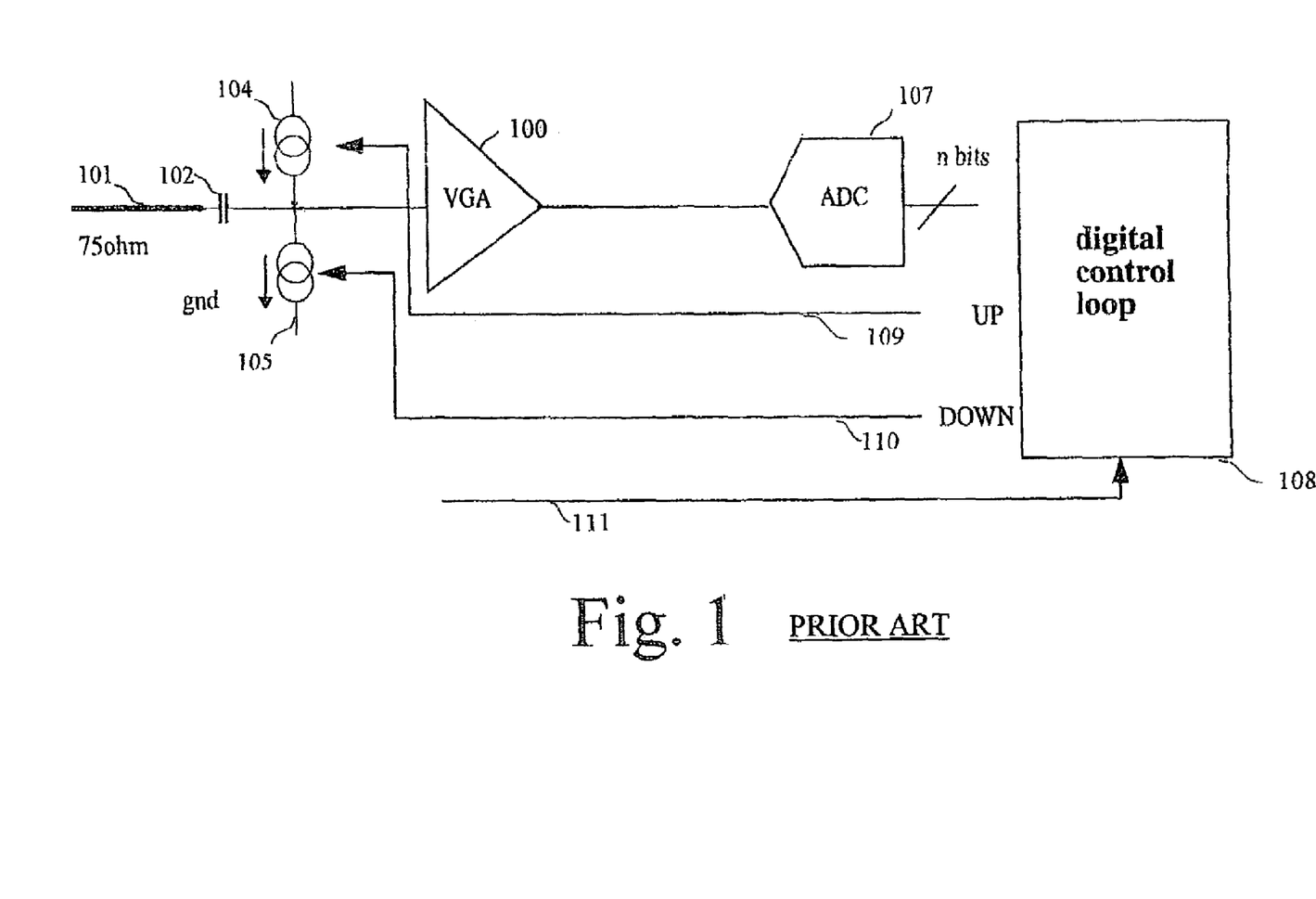
FIG. 1 illustrates a conventional architecture of a video receiver input stage comprising a calibration circuit <<I-8I>>.

FIG. 1 shows a traditional architecture of an input stage equipped with a so-called <<I-8I>> calibration circuit. FIG. 1 shows a coupling capacitor 102 that carries out continuous decoupling of line 101. Coupling capacitor 102 makes it possible to remove the continuous component from the input signal and can be charged and discharged by two power sources 104 and 105 which are controlled by two control signals (UP) and (Down) conveyed by lines 109 and 110, respectively. Downstream from the coupling capacitor, the video signal is amplified by a VGA amplifier 100 providing an output signal that is then digitally converted by means of an analog to digital ADC converter 107. ADC converter 107 provides samples of the video signal that are n-bit coded at the rhythm of a sampling clock. Digital samples are then suitably processed by means of a digital processing unit 108, which processing includes in particular calculating the gain of VGA amplifier 100 and clamp setting.

Generally, at reception of the reference signal corresponding to blacks, an average coding equal to 0 (on n-bit) is sought so as to benefit from all the dynamics of the coding system and to avoid any saturation. To this end, in the so called <<I-8I>> system, the digital processing carried out by the digital processing unit 108 provides a control signal, either UP on control line 109 or DOWN on control line 110 to control power source 104 or power source 105, respectively.

Although this known system provides satisfactory results for designing the input stages of conventional video receivers, it is not the case for modern architectures of video receivers due to the following reasons.

First, the <<I-8I>> system does not—and this is a known fact—allow to perfectly correct calibration error. It is noted that control from any of the control circuits—either UP or DOWN—always results in maintaining a variation between the perfect reference voltage and the ADC converter output code. Today, such lack of accuracy is crippling when compared with the performances required for modern video receivers.

Secondly, miniaturization of video circuits results in a continuous increase of the number of electronic components in semiconductor circuits. The size of elementary components, in particular MOS transistors, is reduced which then constrains to reducing supply voltages. This phenomenon is further aggravated by the development of portable or on board electronics, supplied with increasingly lower supply voltages.

It is not rare to feed video circuits with supply voltages that do not exceed 2 volts.

When supply voltage is reduced, it is clear that any calibration error of the video receiver input stage would reduce the remaining range for digital coding of the video signal thus increasing risks that the receiver saturates. Moreover, reducing the supply voltage also reduces the amplitude of signals that the circuits of the receiver can process. If amplification circuits known as <<track to track amplification circuits>> are used, linearity is affected and a crippling rate of distortion is introduced.

Accordingly, there exists a need for overcoming the disadvantages of the prior art as discussed above.

SUMMARY OF THE INVENTION

It is an object of the present invention to provide architecture of an input stage for a video receiver that allows an accurate and effective calibration.

It is another object of the present invention to realize a video receiver input stage that is adapted for use of low supply voltages.

A third object of the present invention is to realize an input stage for a video receiver that makes it possible to maintain a particularly low distortion rate.

The invention achieves these objects by means of an input stage for a video receiver comprising an amplifier with variable gain, an analog to digital converter for taking samples of the video signal and a digital processing unit for processing digital samples of this video signal. The input stage is wherein an analog regulating circuit sets the input potential at the input of the variable gain amplifier.

Thus, true regulation of this potential can be achieved, and without limitations inherent to the <<all or nothing>> system of circuit I-8I.

In a preferred embodiment, the variable gain amplifier and the digital analog converter have a differential architecture. For this purpose a conversion circuit is interposed between the coupling capacitor and the variable gain amplifier, this conversion circuit allows to generate the video signal on two channels in antiphase, which are centered on the common mode voltage. Differential architecture makes it possible to reduce the amplitude of the analog signals, which is particularly advantageous in the case of a low supply voltage delivering just a few volts. In addition, the differential structure suppresses even harmonics, which substantially improves linearity of the video signal processing.

It can be observed that differential structures are particularly adapted since DC can be achieved on both channels of the differential structure.

In a preferred embodiment, analog regulation of the input potential is carried out by means of a voltage-current converter having a first input taking the potential on one of the differential outputs of the variable gain amplifier and a second input receiving a desired voltage, CVR, from the digital processing circuit. The voltage/current converter then provides a current that is used to charge or to discharge the coupling capacitor in order to adjust the potential input to the differential converter. A control input, PDN, enables blockage of the voltage/current converter when the video signal does not transmit the voltage reference of blacks.

As it can be seen, the input stage precisely controls the charging current of the coupling capacitor, contrary to the <<all or nothing>> structure of conventional circuit <<I-8I>>, and is particularly adapted for realizing receivers operating at low supply voltages.

BRIEF DESCRIPTION OF THE DRAWINGS

The above as well as other features, objects and advantages of the invention will become apparent in the following description when read in conjunction with the accompanying drawings, given by way of nonrestrictive examples, wherein.

The FIG. 3a represents a first embodiment of differential converter 106.

The FIG. 3b illustrates a second embodiment of differential converter 106 with higher performances.

DESCRIPTION OF THE PREFERRED EMBODIMENTS

A preferred embodiment of the invention, particularly adapted to the constitution of an input stage for a battery-supplied video circuit will now be described. Naturally, it is only an exemplary embodiment and use of this circuit can be considered for other applications.

Figure 2:
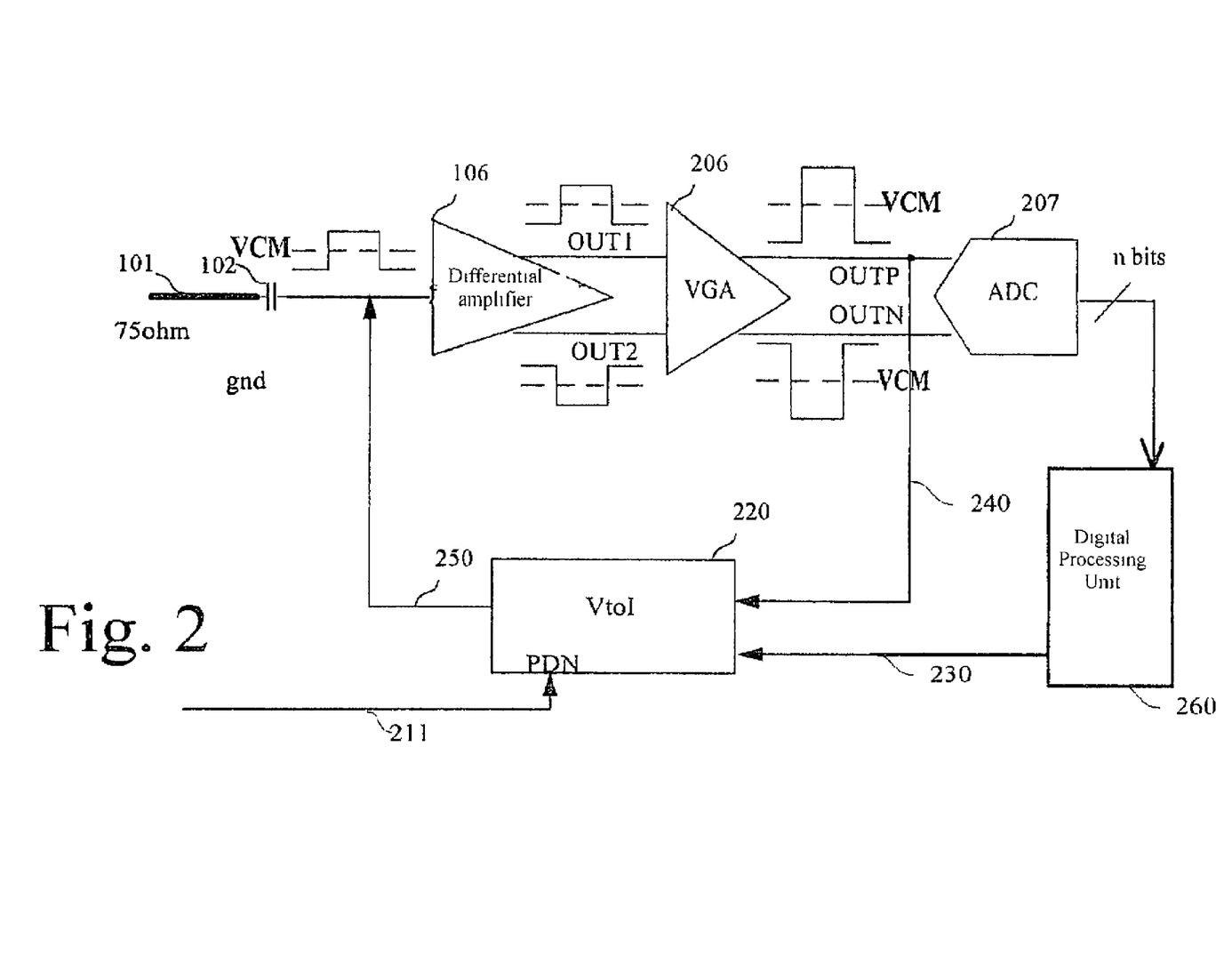
FIG. 2 represents the architecture of an input stage according to the present invention.

FIG. 2 illustrates the architecture of a preferred embodiment of the receiver input stage. Video signal is transmitted through line 101 towards coupling capacitor 102, which removes the continuous component from the video signal. Upstream from the coupling capacitor, signal is transmitted to a differential conversion circuit 106 enabling the generation of two output signals, respectively OUT1 and OUT2 in FIG. 2, these signals are in opposition of phase and are both centered on the common mode potential VCM. Both differential signals OUT1 and OUT2 are then transmitted to a differential variable gain amplifier (known as VGA) 206, the gain of this amplifier being set by a potential (not represented) and a digital processing unit 260 controls the amplifier. Differential variable gain amplifier 206 provides two output signals—OUT P and OUT N, respectively—that are transmitted to an analog to digital (ADC) converter 207 having a differential structure, which allows to sample the differential signal at a preset rhythm; the samples are n-bit coded and then transmitted to the digital processing unit 260.

The differential amplifier 206 and the ADC converter 207 with a differential structure are well-known circuits by people qualified in the art and therefore, they will not be further detailed. We will only say that the differential structure that is readily adopted in this architecture allows to reduce the amplitude of analog signals processed for a given video signal. Thus, for a video signal having a peak-to-peak amplitude of 1 volt, it is observed that the video signal can be analogically processed with amplitudes having a level that does not exceed 250 millivolts, which is particularly useful with very low voltage supply. By means of this differential structure, a great linearity can be achieved for analog processing by reducing the even harmonic rate and total harmonic distortion is maintained at a very low rate.

In a particular embodiment, one of the analog signals—for example signal OUT P—is transmitted to a first input 240 of a voltage/current converter 220 having a second input 230 receiving a Clamp Voltage Reference (CVR). The voltage/current converter is also known as an "operational transconductance to amplify" (OTA) circuit. Such a circuit converts the potential difference between inputs 230 and 240 into a current that is conveyed by a circuit 250 for, according to the case, charging or discharging coupling capacitor 102. The voltage/current converter 220 is inhibited by a control signal transmitted to a PDN input via a control line 211 for stopping any loss of charging or discharging current of the capacitor apart from the reception of the reference signal of blacks.

Thus, it is observed that direct analog control of the input voltage can be achieved by means of the voltage/current converter that charges or discharges capacitor 102. This input voltage can thus be very quickly and very precisely adjusted with the voltage CVR provided by the digital processing system that lies before the input stage.

Thus, with this device it is possible to calibrate the input stage of the receiver such as to ensure <<0>> coding at the output of converter 207 upon reception of the reference signal corresponding to calibration "blacks".

Figure 3A:
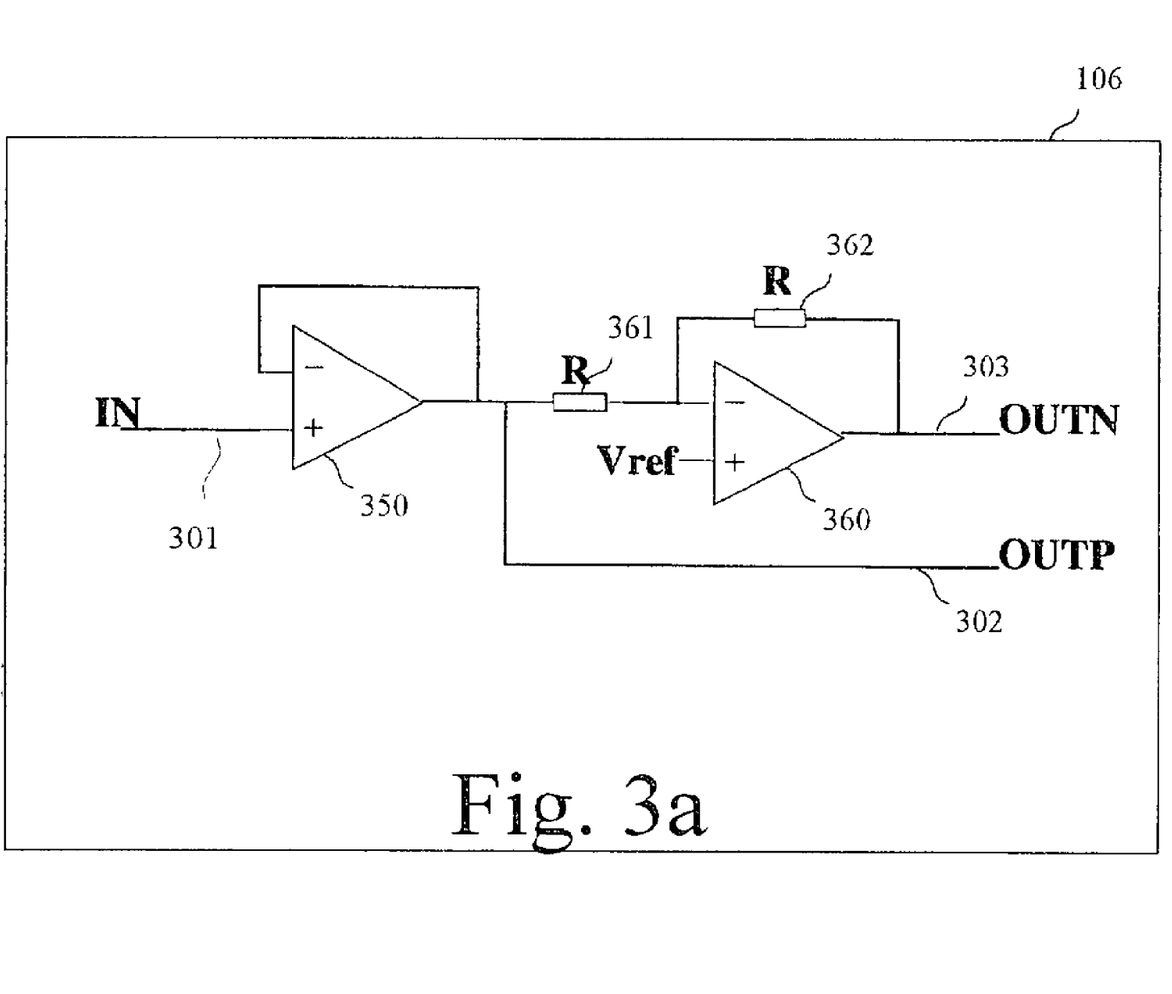

FIG. 3a shows a very simple realization of the differential converter 106 based on the use of operational amplifiers. A first operational amplifier (op amp) 350 is assembled as a tracker and receives the input signal IN that carries the video signal on its positive input. The op amp's negative input is connected to the output. Amplifier 350 then drives an inverter assembly based on a second operational amplifier 360 associated with a first resistor 361 connected between the output of op amp 350 and the negative input of op amp 360, this same negative input being connected to the output of op amp 360 via a second resistor 362. A reference voltage Vref is transmitted to the positive input of op amp 360 and is used to set the common mode voltage on which both differential ways thus generated are centered, respectively at the output of op amp 350 (OUT P on a terminal 302) and at the output of op amp 360 (OUT N on terminal 303).

It is observed that performances of the circuit of FIG. 3a are limited, in particular when a low rate of distortion and a high input rate are wanted. In this case, it can be advantageous to use the circuit of FIG. 3b, based on a differential structure containing Metal Oxide Silicon-type transistors, which allows higher performances in particular in terms of linearity and input rates.

Figure 3B:
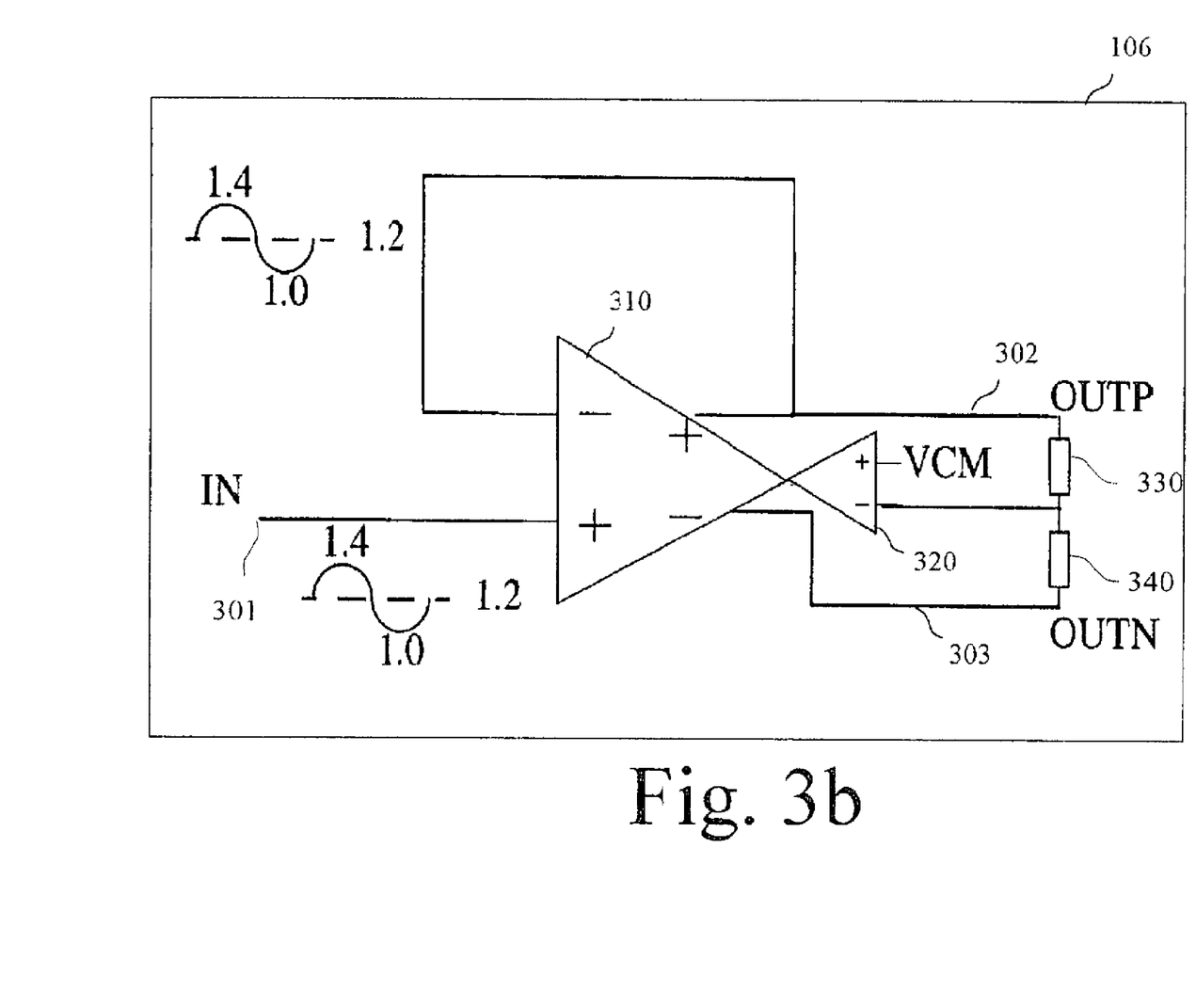

The converter of FIG. 3b comprises a differential structure with a differential amplifier 310, based for example on an architecture composed of Metal Oxide Silicon (MOS) transistors. The positive input 301 of op amp 310 receives the video signal as an input. The differential amplifier provides outputs two signals, respectively OUT P on terminal 302 and OUT N on terminal 303. The output signal OUT-P is connected to the negative input of the differential amplifier, so that this OUT-P signal is driven by the input signal IN existing on terminal 301.

A resistor bridge, comprised of resistors 330 and 340, of equal values, serially connected between terminals 302 (OUT P) and 303 (OUT N), is inserted and this resistive bridge midpoint is connected to a negative input of a second differential amplifier 320—known as a common mode amplifier—the positive input of amplifier 320 receives the common mode reference voltage VCM. Common mode amplifier 320 and differential amplifier 310 interact such that operation of the differential amplifier 310 is controlled by generation of two signals OUT P and OUT N that are in opposition of phase and perfectly centered on the common mode voltage VCM existing on the positive input of amplifier 320.

Figure 4:
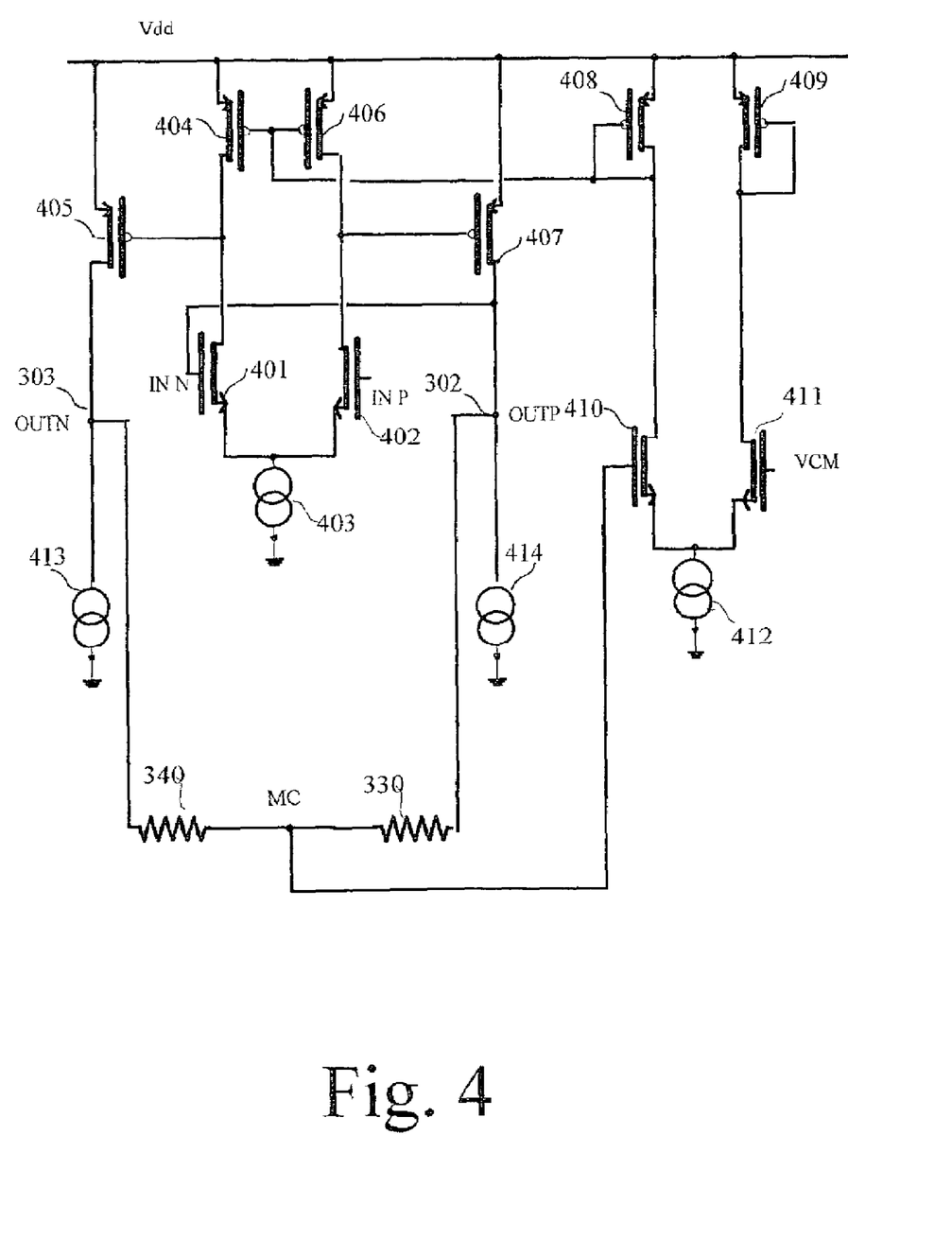
FIG. 4 shows details of an embodiment of the differential converter 106 of FIG. 3b.

FIG. 4 shows an example of realization of the differential converter 106 of FIG. 3b (known as a single to differential converter); it is realized by means of a differential structure based on a pair of NMOS-type transistors 401 and 402. Although the preferred embodiment will describe the use of NMOS-type transistors to compose the differential pair, it is clear that people qualified in the art will be able to readily adapt the structure to an architecture in which the differential pair will be based on PMOS-type transistors. The amplifier is fed by supply source that delivers a voltage Vdd. The source electrode of NMOS transistors 401 and 402 is connected to a power source 403 having its other end connected to ground. Each transistor of the differential pair 401–402 is supplied via its drain electrode by a power source, respectively based on a PMOS transistor 404 and a PMOS transistor 406 that are mounted in current mirror. The source and drain of transistor 404 (respectively transistor 406) are respectively connected to the supply terminal of Vdd and the drain of transistor 401 (respectively transistor 402).

Transistors 404 and 406 are mounted in current mirror and cooperate with a common mode manager stage that comprises a second differential pair associated with a power source 412 and two PMOS-type transistors, respectively 408 and 409. More particularly, the second differential pair comprises two transistors 410 and 411 that have sources connected to a power source 412 having another end connected to ground. The drain of transistor 410 (respectively transistor 411) is connected to the drain of transistor 408 (respectively transistor 409) that has its source is connected to the supply terminal Vdd. The grid of transistor 410 is connected to the midpoint of a resistive bridge comprising both resistors 340 and 330 of identical values, their ends are respectively connected to the differential structure outputs OUT N (terminal 303) and OUT P (terminal 302). The resistive bridge 340–330 is used to obtain, on its midpoint MC, a potential representative of the common mode value of outputs OUT P and OUT N of the differential amplifier. The grid of transistor 411 receives a desired voltage—Vcm—that is used to regulate the polarization level of the stage in common mode and that is controlled by the digital processing unit in order to output a code <<0>> from ADC converter 207.

The grid electrodes of transistors 408, 404 and 406 are all connected together and the grid of transistor 408 is connected to the drain of transistor 408, thus ensuring it operates within the square zone of its characteristic I ($V_{GS}$). Thus the transistors are mounted in current mirror and a same drain current flows through them since, as they are substantially identical, they undergo the same variations of grid-source voltage $V_{GS}$.

The differential pair made of transistors 401 and 402 is a first stage for a second gain stage, a Miller-type stage, which is composed of a pair of PMOS-type transistors 405 and 407 that are assembled as a common source. More precisely, the drain of transistor 401 (respectively 402) is connected to the grid of transistor 405 (respectively 407), and its source is connected to supply terminal Vdd. The drain of transistor 405 (respectively 407) is connected to a power source 413 (respectively 414) that is in turn connected to ground at its other end. The drain of transistor 405 is also connected to the output electrode 303 OUT-N of the converter. Similarly, the drain of transistor 407 will be connected to the output electrode 302 OUT P of the differential converter.

The diagram of FIG. 4 only represents a particular embodiment. In some cases it will be possible to associate a capacitor (not represented) to the Miller stage, in order to fix the gain-band product of the differential structure, as is known by people qualified in the art.

While there has been illustrated and described what are presently considered to be the preferred embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

The invention claimed is:

1. A video circuit input stage comprising:
   a coupling capacitor for receiving a video signal;
   a variable gain amplifier and an analog-to-digital converter, electrically coupled to the coupling capacitor, for sampling the video signal;
   an analog regulating circuit, enabled upon reception of a reference signal at the beginning of each line synchronization, the analog regulating circuit having
      a first input electrically coupled to an output of the variable gain amplifier for receiving an output voltage therefrom,
      a second input for receiving a clamp voltage reference, and
      an output, electrically coupled to the coupling capacitor, for providing a charging current for charging the coupling capacitor to precisely set an input voltage of the received video signal, voltage of the received video signal, and wherein the analog regulating circuit includes a voltage-current converter for providing a charging current according to a potential difference existing between the first and second inputs;
   a digital processing unit, electrically coupled to the analog-to-digital converter, for receiving samples generated by the analog-to-digital converter, the digital processing unit controlling the clamp voltage reference provided to the second input of the voltage-current converter; and
   a differential converter allowing transmission of the video signal on two channels in opposing phase, centered on the common mode potential, and wherein the variable gain amplifier and the analog-to-digital converter comprise differential circuit structure.

2. The video circuit input stage of claim 1, wherein the differential converter comprises a first operational amplifier assembled as a cascade circuit, driving an inverter stage comprising a second operational amplifier mounted as an inverter with a first resistor connected between an output of the first operational amplifier and a negative input of the second operational amplifier, and a second resistor connecting the negative input with an output of the second operational amplifier, the outputs of the first and second operational amplifiers providing the two differential channels in opposing phase.

3. The video circuit input stage of claim 1, wherein the differential converter comprises a first differential amplifier having a first—positive—input receiving the video signal to be processed and a second—negative—input, the first differential amplifier comprising a first output OUT P electrically coupled to the second input and a second output OUT N in opposing phase to the first output OUT P, both outputs OUT N and OUT P being electrically coupled by a resistive bridge comprising a first and a second resistor in series, the first differential amplifier being controlled by a second amplifier having a first input receiving a desired voltage and a second input electrically coupled to the midpoint of the resistive bridge.

4. The video circuit input stage of claim 1, wherein the differential converter comprises a differential amplifier circuit having two input electrodes (IN N, P), two output electrodes (OUT N, OUT P), and including:
 a first stage comprising a first and second transistor of identical polarity and mounted as a differential amplifier, the first and second transistors being supplied by first and second mirror current sources respectively, the current of which being controlled by a control circuit managing common mode and having two inputs receiving a clamp value Vcm and the potential of an electrode which is representative of the common mode potential of the outputs (OUT N, OUT P), respectively; and
 a second Miller gain stage having outputs connected to the output electrodes (OUT N, OUT P), the second stage comprising a third and a fourth transistor of opposite type from the first and second transistors, and having inputs that receive output signals from the first stage.

5. The video circuit input stage according to claim 4, wherein the first, second, third, and fourth transistors are NMOS, NMOS, PMOS and PMOS-type transistors, respectively, and in that the Miller gain stage comprises two PMOS-type transistors assembled as a common source and their drains are connected to the outputs OUT N and OUT P respectively, and their grids are respectively connected so as to receive the corresponding output signal of the first stage.

6. The video circuit input stage according to claim 4, wherein the differential converter comprises a fifth PMOS-type transistor and a sixth PMOS-type transistor for realizing the first and second power sources supplying first and second transistors of the differential pair, respectively, the fifth and sixth transistors being mounted as a common source and each having a drain which is connected to the corresponding drain of one of the first and second transistors of the differential pair, and further having a grid which is controlled by the common mode management circuit.

7. A video signal receiver device, comprising:
 a coupling capacitor for receiving a video signal;
 a variable gain amplifier and an analog-to-digital converter, electrically coupled to the coupling capacitor, for sampling the received video signal;
 an analog regulating circuit, enabled upon reception of a reference signal, the analog regulating circuit having
  a first input electrically coupled to an output of the variable gain amplifier for receiving an output voltage therefrom,
  a second input for receiving a clamp voltage reference, and
  an output, electrically coupled to the coupling capacitor, for providing a charging current for charging the coupling capacitor to precisely set an input voltage of the received video signal, wherein the analog regulating circuit includes a voltage-current converter for providing a charging current according to a potential difference existing between the first and second inputs;
 a digital processing unit (260), electrically coupled to the analog-to-digital converter, for receiving samples generated by the analog-to-digital converter, the digital processing unit (260) controlling the clamp voltage reference provided to the second input of the voltage-current converter; and
 a differential converter allowing transmission of the video signal on two channels in opposing phase, centered on the common mode potential, and wherein the variable gain amplifier and the analog-to-digital converter comprise differential circuit structure.

8. The device of claim 7, wherein the differential converter comprises a first operational amplifier assembled as a cascade circuit, driving an inverter stage comprising a second operational amplifier mounted as an inverter with a first resistor connected between an output of the first operational amplifier and a negative input of the second operational amplifier, and a second resistor connecting the negative input with an output of the second operational amplifier, the outputs of the first and second operational amplifiers providing the two differential channels in opposing phase.

9. device of claim 7, wherein the differential converter comprises a first differential amplifier having a first—positive—input receiving the video signal to be processed and a second—negative—input, the first differential amplifier comprising a first output OUT P electrically coupled to the second input and a second output OUT N in opposing phase to the first output OUT P, both outputs OUT N and OUT P being electrically coupled by a resistive bridge comprising a first and a second resistor in series, the first differential amplifier being controlled by a second amplifier having a first input receiving a desired voltage and a second input electrically coupled to the midpoint of the resistive bridge.

10. The device of claim 7, wherein the differential converter comprises a differential amplifier circuit having two input electrodes (IN N, P), two output electrodes (OUT N, OUT P), and including:
 a first stage comprising a first and second transistor of identical polarity and mounted as a differential amplifier, the first and second transistors being supplied by first and second mirror current sources respectively, the current of which being controlled by a control circuit managing common mode and having two inputs receiving a clamp value Vcm and the potential of an electrode which is representative of the common mode potential of the outputs (OUT N, OUT P), respectively; and
 a second Miller gain stage having outputs connected to the output electrodes (OUT N, OUT P), the second stage comprising a third and a fourth transistor of opposite type from the first and second transistors, and having inputs that receive output signals from the first stage.

11. The device according to claim 10, wherein the first, second, third, and fourth transistors are NMOS, NMOS, PMOS and PMOS-type transistors, respectively, and in that the Miller gain stage comprises two PMOS-type transistors assembled as a common source and their drains are connected to the outputs OUT N and OUT P respectively, and their grids are respectively connected so as to receive the corresponding output signal of the first stage.

12. The device according to claim 10, wherein the differential converter comprises a fifth PMOS-type transistor and a sixth PMOS-type transistor for realizing the first and second power sources supplying first and second transistors of the differential pair, respectively, the fifth and sixth transistors being mounted as a common source and each having a drain which is connected to the corresponding drain of one of the first and second transistors of the differential pair, and further having a grid which is controlled by the common mode management circuit.

* * * * *

UNITED STATES PATENT AND TRADEMARK OFFICE
CERTIFICATE OF CORRECTION

| | | |
|---|---|---|
| PATENT NO. | : 7,050,116 B2 | Page 1 of 1 |
| APPLICATION NO. | : 10/299160 | |
| DATED | : May 23, 2006 | |
| INVENTOR(S) | : Francois Van Zanten et al. | |

It is certified that error appears in the above-identified patent and that said Letters Patent is hereby corrected as shown below:

Cover Page (74) delete "Kisa" and replace with -- Lisa --

Column 6, lines 43-44, delete "voltage of the received video signal,"
Column 8, line 30, at the beginning of the sentence, add -- The --

Signed and Sealed this

Twenty-sixth Day of September, 2006

JON W. DUDAS
*Director of the United States Patent and Trademark Office*